United States Patent [19]
Hellwig et al.

[11] Patent Number: 5,135,332
[45] Date of Patent: Aug. 4, 1992

[54] GROOVING DEPTH INDICATOR FOR A HIGHWAY GROOVING MACHINE

[75] Inventors: Helmut Hellwig, Bad Oeynhausen; Bernd Lemke, Moringen, both of Fed. Rep. of Germany

[73] Assignee: ABG-Werke GmbH, Hameln, Fed. Rep. of Germany

[21] Appl. No.: 563,426

[22] Filed: Aug. 7, 1990

[30] Foreign Application Priority Data

Aug. 12, 1989 [DE] Fed. Rep. of Germany ....... 3926759

[51] Int. Cl.⁵ ................. E01C 23/02; E01C 23/08; G01N 3/00
[52] U.S. Cl. ................................. 404/89; 404/90; 73/84
[58] Field of Search ............ 404/89, 90; 33/700; 73/84, 151; 367/116, 69

[56] References Cited

U.S. PATENT DOCUMENTS

| | | | |
|---|---|---|---|
| 4,047,430 | 9/1977 | Angehrn | 73/151 |
| 4,117,600 | 10/1978 | Guignard | 33/735 |
| 4,179,817 | 12/1979 | Lavigne et al. | 33/735 |
| 4,492,111 | 1/1985 | Kirkland | 73/84 |
| 4,750,117 | 6/1988 | Gregory | 73/632 |

Primary Examiner—Ramon S. Britts
Assistant Examiner—Nancy P. Connolly
Attorney, Agent, or Firm—Chilton, Alix & Van Kirk

[57] ABSTRACT

A grooving depth indicator for a highway grooving or milling machine comprises a display device which is coupled by means of a cable to a mechanism which is employed to adjust the cutting depth of the machine. The display device includes an indicator scale which rotates relative to a zero marker, the scale being caused to rotate by a shaft on which a pulley is mounted. The coupling cable, which is maintained under tension by a spring bias, engages the pulley.

18 Claims, 1 Drawing Sheet

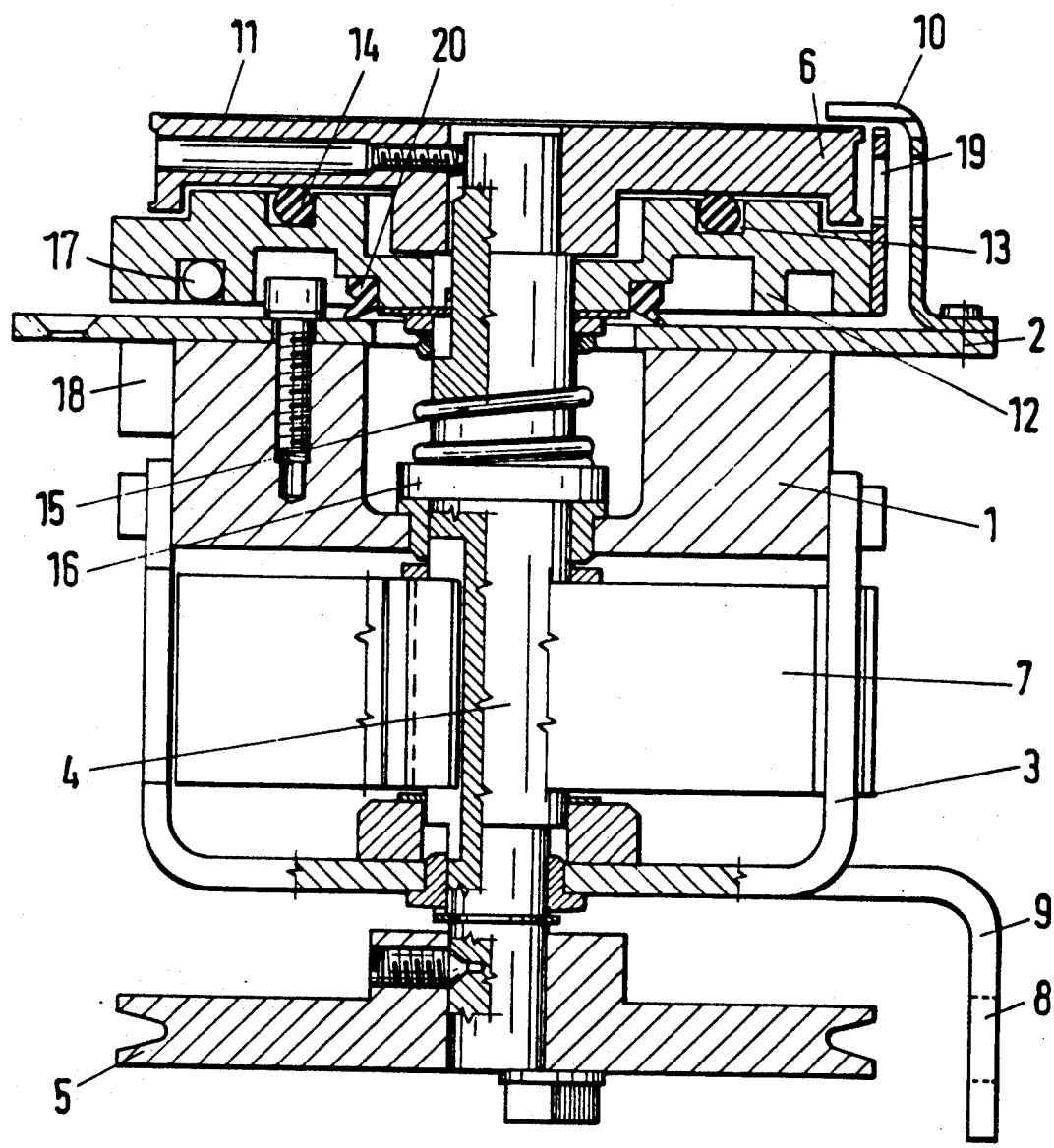

GROOVING DEPTH INDICATOR FOR A HIGHWAY GROOVING MACHINE

BACKGROUND OF THE INVENTION

1. Field of the Invention

This invention relates to a grooving depth indicator for a highway grooving or milling machine, and particularly to a device for providing, at a location remote from the mechanism which determines the depth to which the highway has been cut, an indication of such depth. More specifically, this invention comprises a display device which is coupled by a tension cable to a mechanism which is employed to adjust the cutting depth of a highway grooving machine.

2. Description of the Prior Art

An exemplary prior art highway grooving machine is disclosed in Canadian Patent 994,145. The machine of Canadian patent 994,145 is provided with a milling or grooving depth indicator having a bar or pointer which will be displaced along a linear scale as a function of the vertical distance between the bottom of the cut being formed in the paving and the surface of the pavement ahead of the cutting tool. This bar is connected to a support wheel or some other part of the highway grooving machine which is employed to control the adjustment of the grooving depth. The indicator device shown in Canadian Patent 994,145 is characterized by a very long structure and cannot be satisfactorily integrated into the instrument panel of a highway grooving machine. In the apparatus shown in the Canadian Patent, the cutting depth is set by a hydraulic or electrical motor 12 in cooperation with a hydraulic cylinder 9, the motor 12 operating via a worm drive to adjust the position of a support wheel or wheels 10 for the cutting tools(s) 5. The Canadian Patent mentions, but does not disclose, means for providing, in the operator's cab, an indication of the position of the pointer 13c relative to the linear vertical-adjustment scale 13b. It is suggested, in the prior art, that such a telemetry device could include a Bowden cable or the like. Canadian Patent 994,145 also notes, however, that such telemetry systems have in the past proven to be complicated and costly and thus a simple mechanical pointer and linear scale has been the industry standard grooving depth indicator.

SUMMARY OF THE INVENTION

The object of the invention is therefore to provide a pavement milling or grooving depth indicator which requires only a small structural height and can therefore be readily integrated into an instrument panel of a highway grooving or milling machine.

This object is achieved, in accordance with a preferred embodiment, by novel apparatus which includes a casing having a rotatable shaft housed therein. The shaft carries an indicator disk and an associated indicator scale. A pulley is also mounted on the shaft and is engaged by a tension cable which is connected to the remotely located support wheel or some other part of the cutting depth adjustment mechanism. The shaft is pretensioned relative to the casing by a spring which acts counter to a first direction of travel of the tension cable. An indicator element, i.e., a pointer, is fixed to the casing so as to function as a zero marker.

To summarize, an indicator scale, which rotates relative to a zero marker is connected to a shaft which carries a pulley. A cable, leading to a support wheel or to some other part of the cutting depth adjustment mechanism of the grooving machine, engages the pulley. The cable is held taut by a spring pretension.

The present invention also encompasses a control circuit, by means of which a grooving depth which has been set beforehand, i.e., at the beginning of the grooving or after traveling over a manhole cover or the like, can be reestablished.

BRIEF DESCRIPTION OF THE DRAWING

The invention is described in more detail below with reference to an exemplary embodiment shown in cross-section in the attached drawing.

DESCRIPTION OF THE PREFERRED EMBODIMENT

The grooving depth indicator shown in the drawing comprises a casing block 1. A mounting flange 2 is affixed to a first side of block 1, and a bow 3 extends from the other side of a block 1. A rotatable shaft 4, which carries a pulley 5 at one end and an indicator disk 6 at the other end, is housed in the casing block 1 and the bow 3. The pulley 5 is connected to a tension cable (not shown) which leads to a support wheel (or to another part of the grooving or milling depth adjustment mechanism of a highway grooving or milling machine). The tension cable will be wound or unwound from a drum or the like as a function of the position of the support wheels, such as wheel 10 of Canadian Patent No. 994,145. The pulley 5, and thus the cable, is held tensioned by a torsion spring 7 which engages the shaft 4 and is fastened to the bow 3. The tension cable is led from the support wheel or the like through a guide eye 8 in an angle piece 9 fastened to the bow 3.

A zero marker 10, which cooperates with an indicator scale 11 situated on the indicator disk 6, is connected to the mounting flange 2. The zero marker 10 has, for example, a pointer-shaped tip.

A setting disk 12, which is mounted rotatable relative to the shaft 4, is positioned immediately below indicator disk 6. Setting disk 12 has, on its upper side, a circular channel 13 which receives an O-ring 14. O-ring 14 is held axially in engagement with the underside of the indicator disk 6 through the action of a pressure spring 15, supported on a collar 16 of the shaft 4, which urges the setting disk 12 toward the indicator disk 6. Moreover, a permanent magnet 17 is fastened, by gluing for example, to the underside of setting disk 12. The casing block 1 carries, adjacent to the mounting flange 2, a reed switch 18 which may be actuated by the permanent magnet 17. The setting disk 12 also carries laterally a setting marker 19 for setting the setting disk 12, relative to the indicator disk 6, at a predetermined value on the indicator scale 11.

A seal 20 disposed between the setting disk 12 and the mounting flange 2 prevents, as does the O-ring 14, dirt from penetrating into the inside of the indicator device.

Movement of the tension cable causes, via pulley 5 and shaft 4, the indicator disk 6 to rotate. The degree of rotation of disk 6 will be a direct function of the grooving depth determined by the setting of, and thus measured off, the support wheel of the grooving or milling machine. Rotation of indicator disk 6 causes the setting disk 12 to rotate as a result of the frictional drive connection between disks 6 and 12 established by O-ring 14.

The setting disk 12 may be rotated easily by hand relative to the indicator disk 6 in order to set a specified depth by means of positioning the setting marker 19 relative to the indicator scale 11. The permanent magnet 17 will move relative to switch 18 during such manual rotation of disk 12. When the actual depth reaches the specified depth set, the permanent magnet 17 will be situated above the reed switch 18. The resulting actuation of switch 18 may be employed to control the delivery of power to the cutting depth adjustment control motor of the grooving or milling machine. For example, a motor which has been actuated in order to set the grooving depth may in this manner be shut off. The electrical grooving-depth cutoff circuit thus realized enables a previously set grooving depth to be found again, for example after traveling over a manhole cover or the like.

We claim:

1. A grooving depth indicator for a highway grooving machine, the highway grooving machine having cutting depth adjustment means and a tension cable coupled to the depth adjustment means, the force applied to the cable by the adjustment means being commensurate with the actual cutting depth, said indicator comprising:
   a casing;
   a shaft rotatable mounted in said casing;
   an indicator disc carrying an indicator scale, said disc being connected to said shaft;
   pulley means mounted on said shaft, said pulley means being engageable by the tension cable;
   first spring means for pre-tensioning said shaft relative to said casing; and
   indicator means fixed to said casing for defining a reference mark.

2. The grooving depth indicator of claim 1 wherein said casing comprises a casing block, said block defining a first support for said shaft, and bow means fastened to and extending from said casing block, said bow means forming a second support for said shaft, said spring means extending between said bow means and said shaft.

3. The grooving depth indicator of claim 1 further comprising:
   a setting disc mounted for rotation about said shaft, said setting disc being juxtapositioned to said indicator disc and being rotatable relative to said indicator disc;
   means established a frictional drive connection between said setting disc and said indicator disc;
   a magnetic field generator supported for rotation with said setting disc; and
   a magnetic field responsive signal generator fixed to said casing at a location where said magnet may be brought into proximity with said signal generator during rotation thereof, said signal generator providing an electrical signal indicative of the proximity of said field generator to said signal generator.

4. The grooving depth indicator of claim 2 further comprising:
   a setting disc mounted for rotation about said shaft, said setting disc being juxtapositioned to said indicator disc and being rotatable relative to said indicator disc;
   means established a frictional drive connection between said setting disc and said indicator disc;
   a magnetic field generator supported for rotation with said setting disc; and
   a magnetic field responsive signal generator fixed to said casing at a location where said magnet may be brought into proximity with said signal generator during rotation thereof, said signal generator providing an electrical signal indicative of the proximity of said field generator to said signal generator.

5. The grooving depth indicator of claim 3 wherein said means establish a frictional drive connection comprises an O-ring and second spring means for placing said O-ring in compression between said setting disc and said indicator ring.

6. The grooving depth indicator of claim 4 wherein said means establishing a frictional drive connection comprises an O-ring and second spring means for placing said O-ring in compression between said setting disc and said indicator disc.

7. The grooving depth indicator of claim 3 wherein said magnetic field generator comprises a permanent magnet and wherein said setting disc is provided with a recess which receives said magnet.

8. The grooving depth indicator of claim 4 wherein said magnetic field generator comprises a permanent magnet and wherein said setting disc is provided with a recess which receives said magnet.

9. The grooving depth indicator of claim 5 wherein said magnetic field generator comprises a permanent magnet and wherein said setting disc is provided with a recess which receives said magnet.

10. The grooving depth indicator of claim 6 wherein said magnetic field generator comprises a permanent magnet and wherein said setting disc is provided with a recess which receives said magnet.

11. The grooving depth indicator of claim 3 wherein the setting disk further carries a setting marker.

12. The grooving depth indicator of claim 4 wherein the setting disk further carries a setting marker.

13. The grooving depth indicator of claim 5 wherein the setting disk further carries a setting marker.

14. The grooving depth indicator of claim 6 wherein the setting disk further carries a setting marker.

15. The grooving depth indicator of claim 7 wherein the setting disk further carries a setting marker.

16. The grooving depth indicator of claim 8 wherein the setting disk further carries a setting marker.

17. The grooving depth indicator of claim 9 wherein the setting disk further carries a setting marker.

18. The grooving depth indicator of claim 10 wherein the setting disk further carries a setting marker.

* * * * *